Jan. 24, 1967 A. B. LARSEN 3,300,651

HIGH SPEED STATIC SWITCH

Filed July 5, 1963 5 Sheets-Sheet 1

INVENTOR.
Arthur B. Larsen
BY
Hill, Sherman, Meroni, Gross & Simpson
ATTORNEYS

Jan. 24, 1967 A. B. LARSEN 3,300,651

HIGH SPEED STATIC SWITCH

Filed July 5, 1963 5 Sheets-Sheet 2

INVENTOR.
Arthur B. Larsen
BY
Hill, Sherman, Meroni, Gross & Simpson
ATTORNEYS

Jan. 24, 1967 A. B. LARSEN 3,300,651

HIGH SPEED STATIC SWITCH

Filed July 5, 1963 5 Sheets-Sheet 3

INVENTOR.

Arthur B. Larsen

BY

Hill, Sherman, Meroni, Gross & Simpson

ATTORNEYS

INVENTOR.
Arthur B. Larsen
BY
Hill, Sherman, Meroni, Gross & Simpson
ATTORNEYS

Jan. 24, 1967 A. B. LARSEN 3,300,651

HIGH SPEED STATIC SWITCH

Filed July 5, 1963 5 Sheets-Sheet 5

INVENTOR.
Arthur B. Larsen
BY
Hill, Sherman, Meroni, Gross & Simpson
ATTORNEYS 3,300,651
HIGH SPEED STATIC SWITCH
Arthur B. Larsen, Parma, Ohio, assignor to
TRW Inc., a corporation of Ohio
Filed July 5, 1963, Ser. No. 292,881
6 Claims. (Cl. 307—66)

This invention relates to a static switching system for switching from a first electric supply to a second electric supply in response to a failure condition or the like in the first supply and particularly to such a system wherein operation of the first supply is restored when the first supply failure condition is removed.

It is an object of the present invention to provide a static switching system for supplying essentially uninterrupted alternating current to a load, and preferably providing for switching from one electric supply to another in no more than ¼ cycle.

It is a further object of the present invention to provide an electric circuit capable of detecting a catastrophic failure in an electric supply in less than ⅛ cycle.

Another object of the invention is to provide a static switching system of increased reliability.

A still further object of the invention is to provide a static switching system which prevents a non-preferred supply from being substantially affected by any load such as a short circuit present on the input side of a preferred supply.

Yet another object of the invention is to provide an improved static switching system utilizing a reduced number of components while providing for starting up of the preferred supply from a zero load current condition.

Other objects, features and advantages of the present invention will be apparent from the following detailed description taken in connection with the accompanying drawings, in which.

Figure 4A:
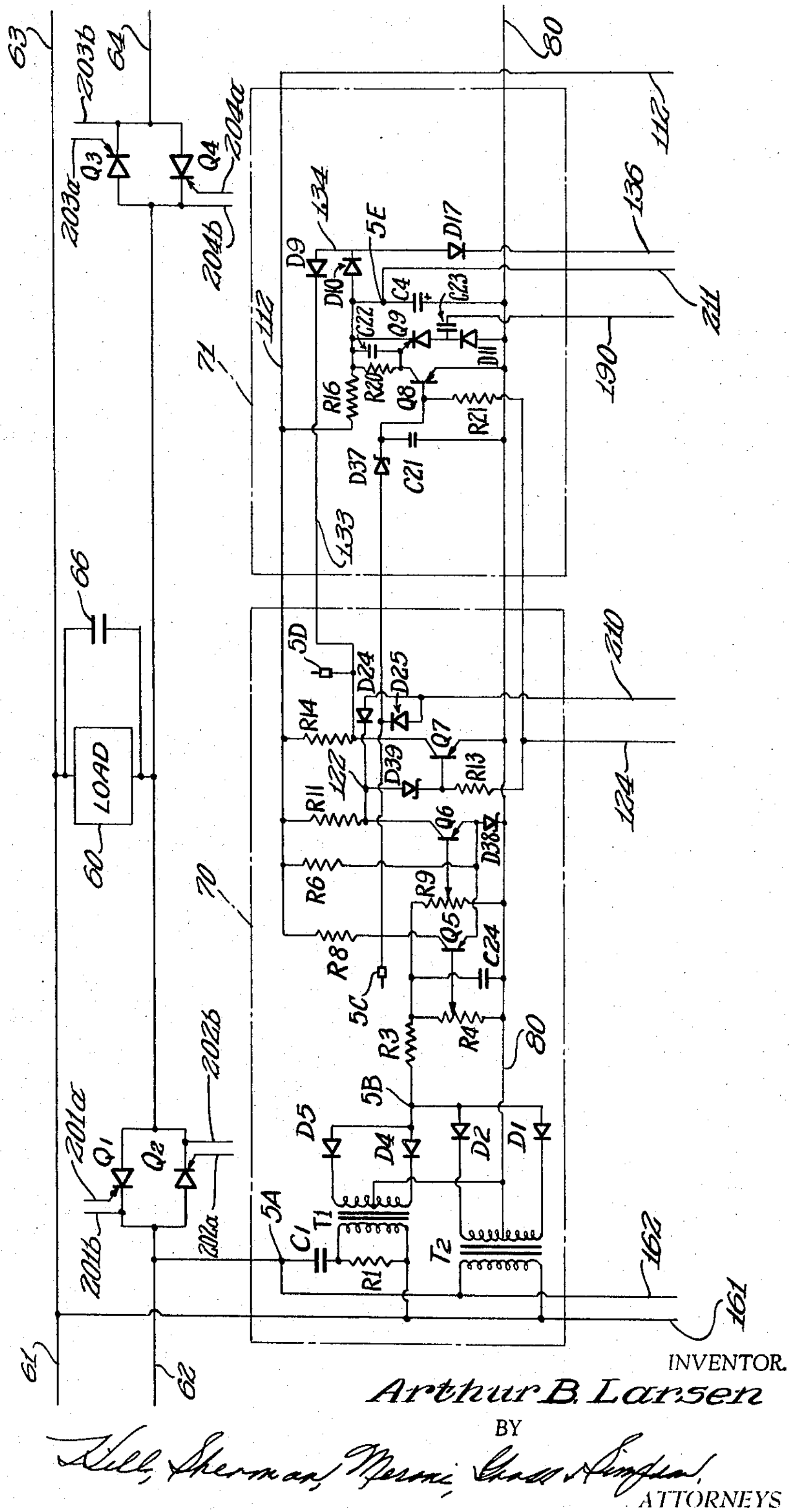
Figure 4B:
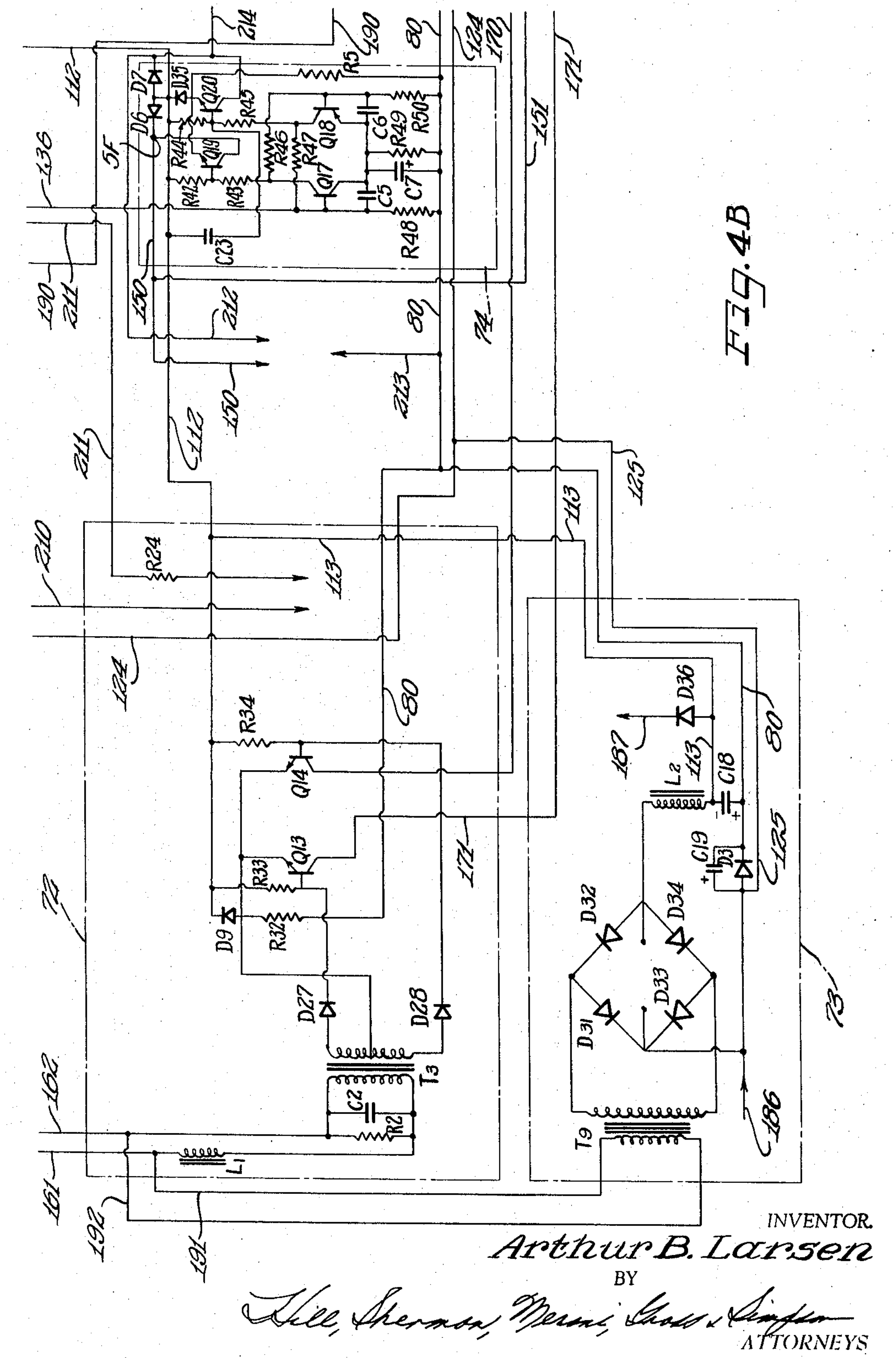
Figure 4C:
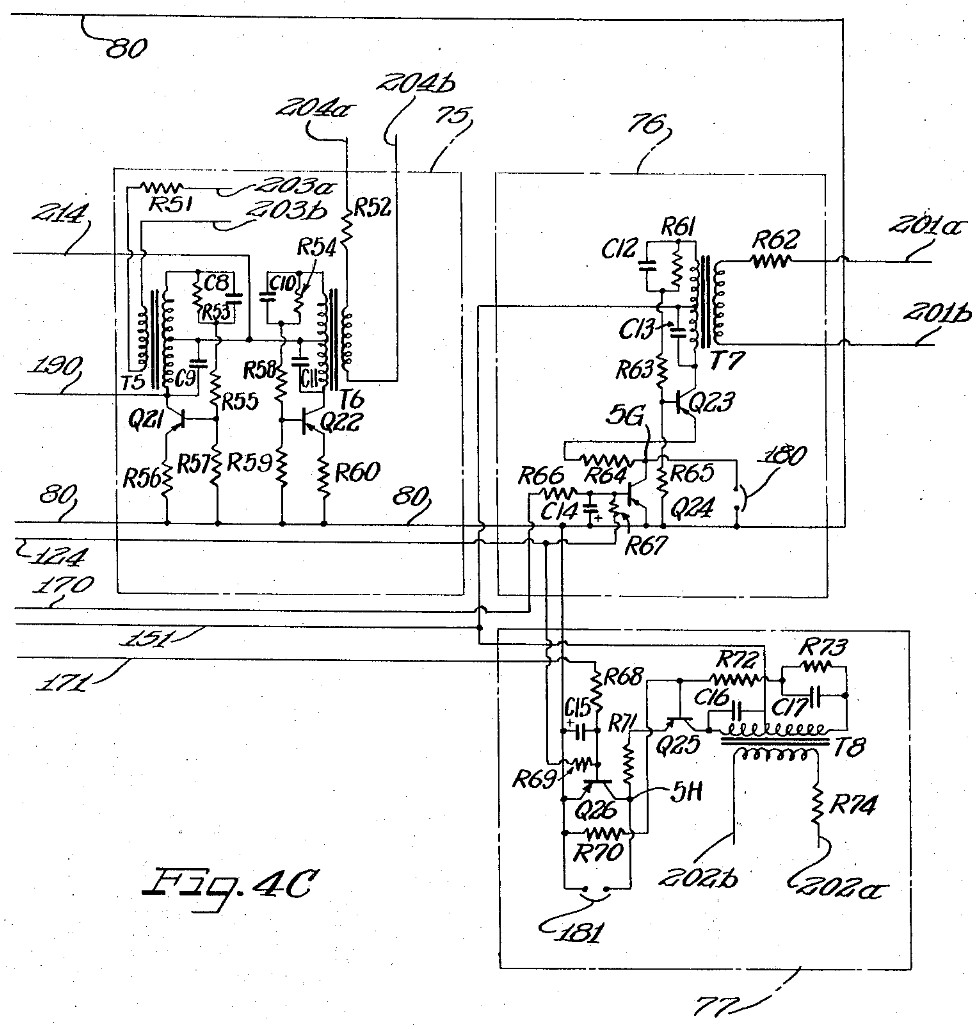

FIGURES 4A, 4B and 4C taken together represent a detailed electric circuit diagram for a preferred embodiment of the present invention; and FIGURES 5A through 5K represent waveform diagrams for explaining the operation of the circuit of FIGURES 4A–4C.

Figures 1, 2A, 2B, 3A, 3B, 3C, 3D:
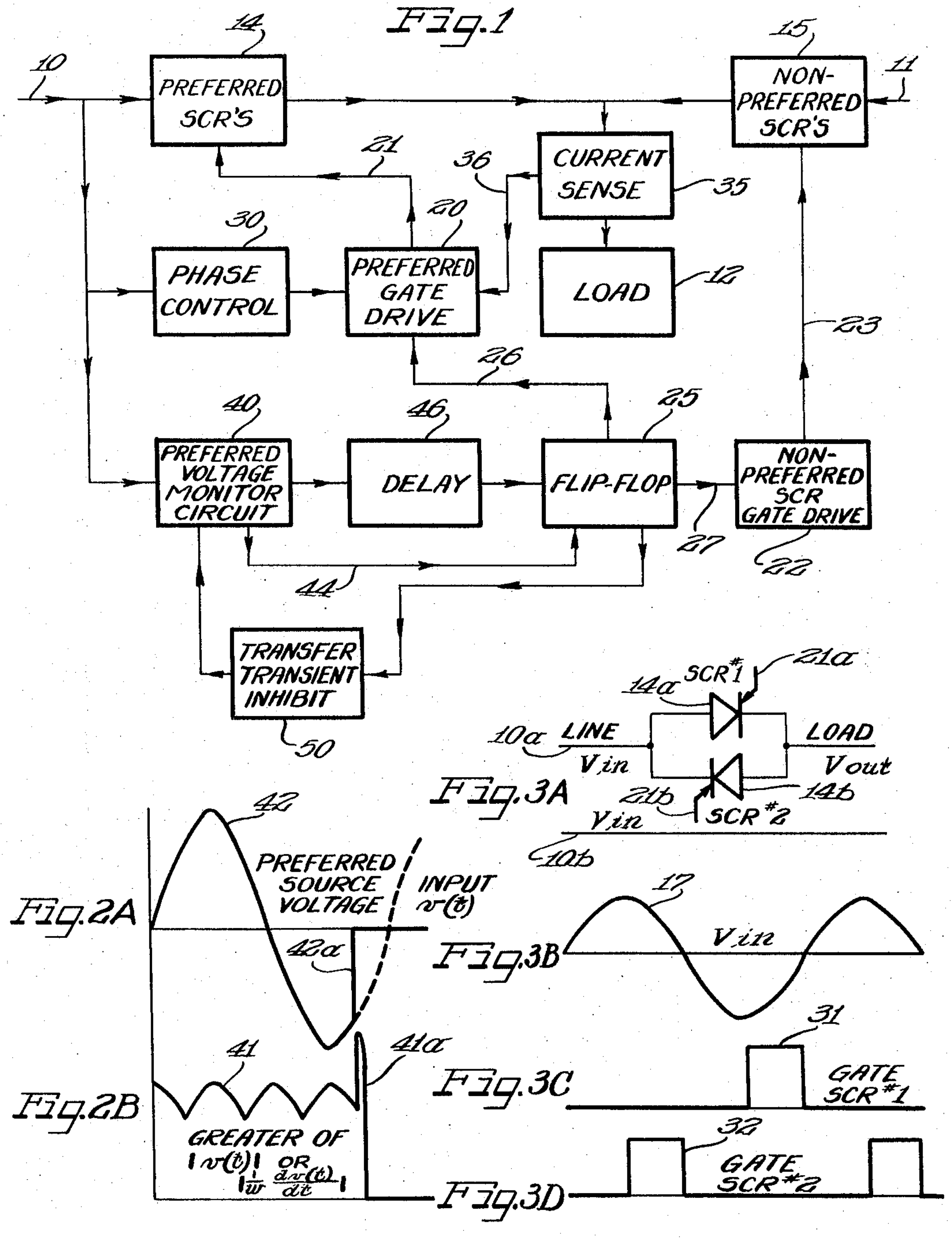
FIGURE 1 is a general block diagram of a first embodiment of a static switching system.
FIGURE 2A shows the waveform of the preferred source voltage as a function of time.
FIGURE 2B illustrates a waveform generated in the preferred voltage monitor circuit of FIGURE 1.
FIGURES 3A through 3D are diagrammatic views utilized in explaining the operation of the embodiment of FIGURE 1.
Figure 5:
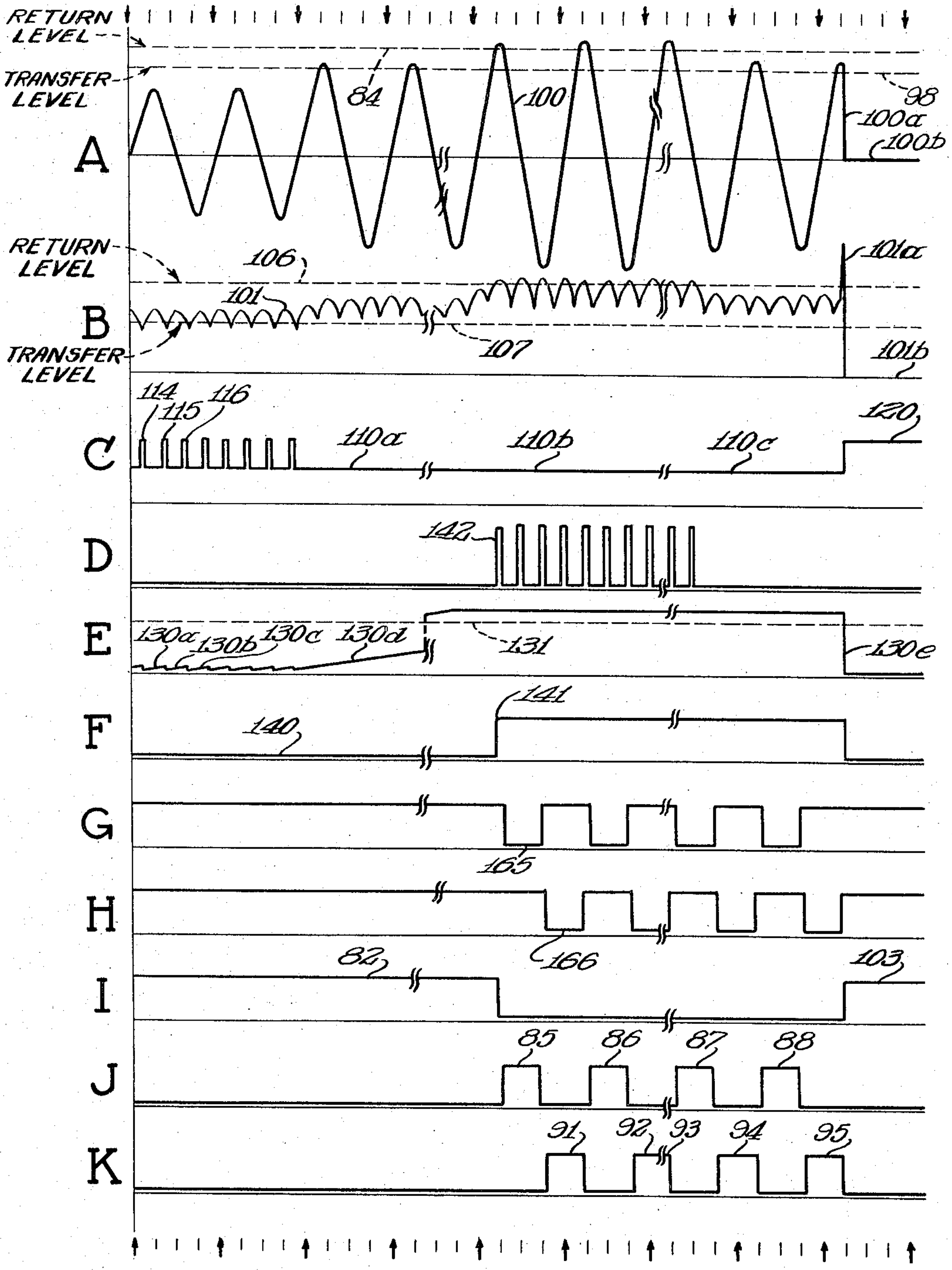

In the following description, FIGURES 2A and 2B, FIGURES 3A–3D, FIGURES 4A–4C and FIGURES 5A–5K shall be referred to as FIGURES 2, 3, 4 and 5 when it is desired to refer to the various figures collectively. FIGURES 2, 3 and 5 represent waveform diagrams having the same time scale. With respect to FIGURE 4, FIGURE 4B represents a continuation of FIGURE 4A in the downward direction, while FIGURE 4C represents a continuation of FIGURES 4A and 4B in the right hand direction.

In the embodiment of FIGURES 1–3, line 10 represents a preferred supply while line 11 represents a non-preferred supply. A load component is indicated at 12 which is normally to be energized from the preferred supply 10 but which in the event of a failure condition of the preferred supply is to receive energy from the non-preferred supply 11. A preferred SCR's component 14 represents suitable controllable static switch components such as silicon controlled rectifiers 14*a* and 14*b* shown in FIGURE 3A. The non-preferred SCR's component 15 may comprise any suitable static switch component such as silicon controlled rectifiers connected as indicated in FIGURE 3A. In FIGURE 3A, the preferred supply is represented as a pair of supply lines 10*a* and 10*b*. FIGURE 3B illustrates an alternating current voltage waveform 17 such as may be supplied by preferred supply 10 and non-preferred supply 11.

A preferred gate drive component 20 is illustrated as being coupled to the preferred static switch component 14 by means of a line 21 corresponding to lines 21*a* and 21*b* controlling rectifiers 14*a* and 14*b* in FIGURE 3A. A non-preferred gate drive component 22 is illustrated in FIGURE 1 as controlling the non-preferred static switch component 15 via line 23. A flip-flop 25 in one condition activates the preferred gate drive component 20 via line 26 and in another condition activates the non-preferred gate drive component 22 via a line 27. A phase control component 30 controls gate drive component 20 in such a way as to prevent the non-preferred side 11 from being affected by any load such as a short circuit being present at the preferred supply 10. In the embodiment illustrated in FIGURE 3, phase control 30 allows activation of rectifier 14*a* for intervals represented by waveform 31 in FIGURE 3C and enables activation of rectifier 14*b* at time intervals represented by waveform 32 in FIGURE 3D.

A current sense component 35 is utilized when the preferred supply 10 is first connected with the load 12 to override the phase control circuit 30 in the absence of load current as indicated by line 36 representing an override control of the preferred gate drive component 20. Current sense circuit 35 causes both preferred side rectifiers 14*a* and 14*b*, FIGURE 3A, to be turned on regardless of the phase of the input voltage. This is necessary since the phasing of the preferred gate drive by phase control component 30 does not allow either rectifier 14*a* or 14*b* to carry any current under starting conditions.

A preferred voltage monitor circuit 40 includes means for rectifying the preferred voltage $v(t)$, for obtaining a derivative with respect to time of the supply voltage and rectifying the same and for selecting the greater of the rectified supply voltage $v(t)$ and the rectified derivative voltage to generate waveform 41 shown in FIGURE 2B. As indicated in FIGURE 2B, the derivative of the preferred voltage is effectively equalized in peak value with the peak value of the preferred source voltage, for example by applying a factor $1/\omega$ where $\omega$ represents the angular frequency of the waveform shown in FIGURE 2A and designated generally by reference numeral 42.

When the preferred supply 10 fails as represented by portion 42*a* of waveform 42 in FIGURE 2A, for example, this will be reflected as indicated at 41*a* in the monitor circuit combination output waveform shown in FIGURE 2B. When the voltage of waveform 41 in FIGURE 2B falls below a predetermined level, voltage monitor circuit 40 triggers flip flop 25 via line 44 to shut off preferred gate drive 20 and activate non-preferred gate drive 22 to supply load 12 from the non-preferred supply 11. The circuitry is such that the switching operation may take place in less than ⅛ cycle in the event of a catastrophic failure of the preferred source as indicated at 42*a* in FIGURE 2A. The switching will take place in ¼ cycle in response to a dropping of the preferred source voltage slightly below the prescribed limit. This speed is accomplished by avoiding the use of any filtered output for comparison purposes and using instead the combination output waveform such as represented in FIGURE 2B involving the combination of the preferred source voltage waveform 42, FIGURE 2A, with waveforms which are differentiated or out of phase with respect to the preferred voltage waveform.

Upon return of the preferred side to its proper voltage, and after a delay determined by delay circuit 46, flip-flop component 25 is again set to cause tthe preferred side gate drive 20 to be activated. The voltage of the preferred supply at which the load 12 is transferred to the preferred supply 10 is set higher than that at which the transfer occurs in the opposite direction; this avoids an oscillatory condition due to the drop which will occur in the preferred side voltage when the preferred side again assumes the load. Where the load is capacitive, an even larger transient drop may occur; to prevent this from causing the voltage monitor circuit 40 to again reset the flip-flop 25, the transfer transient inhibit circuit component 50 is provided which operates at the moment of transfer back to the preferred supply to momentarily inactivate the preferred voltage monitor circuit 40.

In the illustrated embodiment, phase control 30 acts on the preferred gate drive circuitry 20 in such a way that each gate or switch element such as 14*a* and 14*b* in FIGURE 3A is conductive only for that portion of the cycle during which the current would start flowing in the particular switch element or rectifier under conditions of a leading power factor load. This arrangement is shown in FIGURE 3. In the event that the load would not ordinarily satisfy this condition, sufficient capacitive reactance must be added in the illustrated embodiment to achieve a leading power factor.

The advantages of the illustrated embodiment are the added reliability of static devices (over mechanical switches) and the extreme speed of operation. The high speed of operation is achieved because of the rapidity with which the preferred voltage monitor 40 can detect a failure and because the particular gate drive 20 employed for the preferred side, along with the leading power factor load 12, prevents the non-preferred side from being affected by any load present on the input side of the preferred line 10. In particular, if the preferred side fails by virtue of being shorted out, the non-preferred side will not be shorted even momentarily.

*Summary of operation for the embodiment of FIGURES 1–3*

When the preferred supply 10 is connected with the load 12, current sense component 35 senses the zero load current and activates the preferred SCR's component 14 via preferred gate drive 20, overriding phase control component 30. When load current has been established, phase control 30 takes control of gate drive 20 and activates silicon control rectifiers 14*a* and 14*b*, FIGURE 3A, as represented in FIGURES 3C and 3D.

Preferred voltage monitor circuit 40 generates a combination output voltage as represented in FIGURE 2B representing, for example, the greater of the rectified preferred voltage from supply 10 and the rectified time derivative of the supply voltage from supply 10 weighted to have the same peak values as the rectified preferred supply voltage.

When this combination output waveform 41 falls below a predetermined level indicating a failure of the preferred source voltage such as indicated at 42*a* in FIGURE 2A, monitor circuit 40 triggers flip-flop 25 to deactivate preferred gate drive 20 and activate non-preferred gate drive 22 supplying current to load 12 from the non-preferred supply 11.

When the combination output voltage indicated in FIGURE 2B returns to a level somewhat above the failure indicating level, preferred voltage monitor circuit 40 sets flip-flop 25 through delay 46 to restore the connection between the preferred supply 10 and load 12 and to deactivate non-preferred supply 11.

The function of the phase control 30 is to prevent the non-preferred side from being affected by any load present on the input side of the preferred line such as a short circuit at the preferred side. The static switch means represented by components 14 and 15 provide substantially increased reliability and extremely high speed operation. The voltage monitor circuit can respond to a voltage failure with great rapidity because the circuitry does not require a filtered output.

The embodiment of FIGURES 4 and 5 represents an improved static switching system for switching a load 60, FIGURE 4A, from preferred supply lines 61 and 62 to non-preferred supply lines 63 and 64. As in the previous embodiment, the switching operation is preferably carried out by static switching devices such as silicon controlled rectifiers Q1, Q2 and Q3, Q4. In the preferred embodiment, the preferred side rectifiers Q1 and Q2 are activated during normal operation during time intervals when a current would start flowing in the particular rectifiers under conditions of a leading power factor load. In the event the load 60 would not ordinarily satisfy this condition, sufficient capacitive reactance as indicated at 66 may be added to achieve the desired leading power factor.

The circuitry of FIGURE 4 includes a preferred source voltage monitor circuit indicated by the block designated by the reference numeral 70 in FIGURE 4A, a preferred source return delay circuit indicated by block 71 in FIGURE 4A, a gate phase control circuit indicated by block 72 in FIGURE 4B, a power supply component indicated by block 73, a silicon controlled rectifier gate drive control flip-flop indicated by block 74 in FIGURE 4B, a SCR gate drive supply oscillators component (non-preferred) indicated by block 75 in FIGURE 4C, a SCR gate drive supply oscillator component (preferred; negative side) indicated by block 76 and a SCR gate drive supply oscillator component (preferred; positive side) indicated by block 77.

The preferred side supply 61, 62 is monitored by transformer T2 and diodes D1 and D2. The capacitor C1 and resistor R1 form a differentiating circuit to provide a voltage at the secondary of transformer T1 which is equalized in peak value with respect to the voltage at the secondary of transformer T2. The voltage at point 5B in FIGURE 4A is thus the greater of the rectified or absolute value of the supply voltage $v(t)$ or $1/\omega dv(t)/dt$, rectified. Voltages are with respect to ground bus 80 unless otherwise noted. Absolute magnitudes are used when comparing different voltages so that, for example, minus 10 volts with respect to ground bus 80 is higher or greater than minus 7 volts with respect to the amplitude selector function at point 5B.

Where the input supply voltage has a waveform as indicated in FIGURE 5A, the waveform at point 5B will be as indicated in FIGURE 5B. By way of example, the circuitry may be arranged so that control rectifiers Q3 and Q4 are activated during initial application of voltage to load 60 as indicated at 82 in FIGURE 5I. The circuitry may begin activation of control rectifiers Q1 and Q2 when the supply voltage reaches a level such as indicated at 84 in FIGURE 5A which may correspond to a voltage level of 105 volts R.M.S. The control rectifier Q1 is then activated at time intervals such as indicated at 85–88 in FIGURE 5J, while control rectifier Q2 is activated during intervals such as indicated at 91–95 in FIGURE 5K.

When the supply voltage at lines 61, 62 (the preferred supply) falls below a transfer voltage level such as indicated by dash line 98 in FIGURE 5A, for example as indicated by waveform parts 100*a* and 100*b* of waveform 100 in FIGURE 5A and as indicated by waveform parts 101*a* and 101*b* in FIGURE 5B, control rectifiers Q3 and Q4 are reactivated as indicated at 103 in FIGURE 5I. The return voltage level for return to the preferred supply is indicated at 106 in FIGURE 5B while the transfer voltage level for switching to the non-preferred supply is indicated at 107 in FIGURE 5B. The return voltage level indicated at 98 in FIGURE 5A may, for example, correspond to a voltage of 95 volts R.M.S.

The voltage appearing at point 5B in FIGURE 4A is attenuated in resistor R3 and potentiometer R4, and the output of the potentiometer R4 is compared by transistor Q5 to the reference voltage developed across zener diode D38. Potentiometer R4 is adjusted so that Q5 is just in the "on" condition at an input voltage across lines 61, 62 just higher than the voltage transfer level represented by line 98 in FIGURE 5A at which it is desired to transfer the load from the preferred side to the non-preferred side. As long as Q5 is held on, the voltage at terminal 5C will not rise significantly above the emitter voltage of Q5 as determined by zener diode D38 and as indicated by level 110 in FIGURE 5C, and hence will not be adequate to cause zener diode D37 to conduct, zener diode D37 having a greater zener voltage than zener diode D38. Transistor Q8 thus remains off, control rectifier Q9 remains off, and capacitor C4 is slowly charged through R16 to the voltage of line 112 which is connected with power supply component 73 by line 113 as indicated in FIGURE 4B.

As indicated in FIGURE 5C, each time the waveform of FIGURE 5B falls below transfer level 107, Q5 switches to an "off" condition as represented by pulses such as 114, 115 and 116 in FIGURE 5C representing an increase in the voltage level at point 5C in FIGURE 4A relative to the level 110 in FIGURE 5C corresponding to an "on" condition of Q5. The plots in FIGURES 5C, 5D, 5E and 5F represent the negative of the voltage of interest relative to bus line 80 for convenience in plotting the various waveforms. When the waveform of FIGURE 5B is continually above the transfer level 107, the voltage level at point 5C is continuously at the level represented at 110*a*, 110*b* and 110*c*, FIGURE 5C, corresponding to an "on" condition of Q5. When the voltage of waveform 101 drops to an absolute value below transfer level 107, for example as indicated at 101*b* in FIGURE 5*B*, Q5 is switched to an "off" condition to provide a relatively high negative voltage at point 5C relative to ground bus 80 as indicated by level 120 in FIGURE 5C.

When the prefrred voltage waveform 100, FIGURE 5A, reaches return level 84, FIGURE 5A, waveform 101, FIGURE 5B, will reach return level 106 at its peaks, this negative voltage at point 5B in FIGURE 4A relative to ground bus 80 being sufficient as attenuated by resistor R3 and potentiometer R9 to switch transistor Q6 to "on" condition in spite of the reverse bias applied to the emitter of Q6 by the reference zener diode D38. This will momentarily decrease the absolute value of the voltage at point 122 in FIGURE 4A to a value which is no longer sufficient to break down zener diode D39. The absence of current through D39 results in transistor Q7 being allowed to go off and this in turn causes the voltage at terminal 5D to tend to rise in magnitude relative to bus 80 and thus to initiate charging of capacitor C4 through diodes D9 and D10. The details of the charging of capacitor C4 which serves the function of delay 46 in FIGURE 1 will now be described.

It will be noted that resistor R13 coupled to the base of Q7 is connected to a ground line 124 which is connected to line 125, FIGURE 4B, and which in turn is associated with the side of power supply component 73 which is positive with respect to line 113.

The negative of the voltage developed across capacitor C4 is represented in FIGURE 5E. It will be observed that each time Q5 is switched to an "on" condition as represented by voltage level 110 in FIGURE 5C, charging of capacitor C4 begins as represented by portions such as 130*a*, 130*b* and 130*c* in FIGURE 5E, but when Q5 is again switched to the "off" condition as represented by pulses such as 114, 115 and 116 in FIGURE 5C, capacitor C4 is again discharged through Q9. When, however, waveform 101 is continuously above transfer level 10, FIGURE 5B, capacitor C4 is continuously charged as indicated at 130*d* in FIGURE 5E until the absolute value of the voltage across C4 reaches the level indicated at 131 in FIGURE 5E which allows activation of the preferred supply.

Capacitor C4 is charged from power supply line 112 through resistor R14, conductor 133, and diodes D9 and D10. Before capacitor C4 is charged to level 131, FIGURE 5E, if Q7 is switched to "off" condition, the voltage at line 134 will not be sufficiently negative to produce conduction through diode D17. If however C4 is charged to the level indicated at 131 in FIGURE 5E, and Q7 is switched to off condition, current from power supply line 112 will flow through R14, D9, D17 and line 136 to switch transistor Q17, FIGURE 4B, to "on" condition. This turns transistor Q18 off through the feedback provided by resistor R46, resistor R47 and resistor R49 and also turns transistor Q19 on and transistor Q20 off. The negative of the collector voltage of transistor Q19 is is represented in FIGURE 5F and it will be observed that the collector voltage shifts from a low negative value as indicated by waveform portion 140 to a high negative value as indicated by waveform portion 141 in response to a voltage pulse 142 appearing at terminal 5D due to the switching of transistor Q7 to "off" condition.

With Q19, FIGURE 4B, of component 74 "on," power is supplied via lines 150 and 151, FIGURES 4B and 4C, to the preferred positive side component 77 and the preferred negative side component 76. The oscillators associated with transistors Q23 and Q25 are self-starting and will oscillate whenever they are provided with a voltage supply through Q19 and a return path through Q24 for Q23 and through Q26 for Q25. Transistors Q24 and Q26, FIGURE 4C, are turned on by Q14 and Q13 of component 72, FIGURE 4B. Transistors Q13 and Q14 are in turn driven through diodes D27 and D28 from transformer T3, which in turn is connected to the preferred supply lines 61 and 62 via lines 161 and 162, a reactor L1 being shown in line 161. L1 is chosen such that the current in the secondary of transformer T3 is approximately 90° out of phase (lagging with respect to the preferred source voltage. This means that the oscillators of components 76 and 77, FIGURE 4C, will be operative for a period of about 90° on each side of the zero crossing of the preferred side voltage wave 100 as represented by waveforms 165 and 166 in FIGURES 5G and 5H representing the states of Q24 and Q26.

The circuit for energizing Q24 is traced from the collector of Q14, FIGURE 4B, via conductor 170 and resistor R66 to the input of Q24. Similarly, the energizing circuit for Q26 is traced from the collector of Q13, FIGURE 4B, via line 171 in FIGURES 4B and 4C and resistor R68 to the input of Q26.

The phasing of the energization of silicon controlled rectifiers Q1 and Q2 as shown in FIGURES 4 and 5 is a simplification and improvement over the circuitry of FIGURES 1–3. Besides requiring fewer components than in the double phased gating scheme of the first embodiment, the arrangement of figure also allows elimination of the zero current detection circuit or current sense component 35 of FIGURE 1. The zero current detection circuit is no longer needed since the gate pulses are now present during that part of the cycle where the zero current detection would have had to insert them to initiate conduction.

Transistors Q24 and Q26, FIGURE 4C, may be shorted out as indicated at 180 and 181 for 8 millisecond operation with reactive loads.

Terminals 183 and 184 of power supply component 73, FIGURE 4B, may be connected with a corresponding power supply component associated with the non-preferred lines 63 and 64 if the system is to be used with two power lines. If the switching system is to operate with an inverter, the B minus terminal (ground) of the inverter power supply is connected at 186, FIGURE 4B, and the B plus terminal (negative) of the inverter logic power supply is connected to line 187, FIGURE 4B. The primary of transformer T9 is coupled to supply lines 161 and 162 via lines 191 and 192. It is evident that in the event of a failure of the preferred supply 61, 62, the circuitry of FIGURE 4 must be powered from an alternative direct current supply either connected with the non-preferred supply or some other source of power.

When the preferred side voltage falls below the transfer level 98, FIGURE 5A, as indicated at 100*a*, 100*b*, the negative voltage at the base of Q5, FIGURE 4A, is no longer sufficiently high to keep it turned on, and the collector voltage at terminal 5C rises in absolute value to level 120 as indicated in FIGURE 5C. The zener voltage of diode D37 of component 71, FIGURE 4A, is now exceeded, and the resultant current turns on Q8. This results in a current flow through resistor R20 which turns on Q9 to rapidly discharge capacitor C4 as indicated by waveform portion 130*e* in FIGURE 5E. It may be noted that the charging time of capacitor C4 to level 131, FIGURE 5E, may be such as to give a time delay of approximately one second. The discharge time as represented at 130*e* is, of course, relatively extremely rapid. Diode D11 and the coupling through capacitor C23 and line 190, FIGURES 4A, 4B and 4C, to the collector of Q21 serves to insure turn-off of Q9, FIGURE 4A, after it has discharged C4. Q9, FIGURE 4A, being on also results in a current flow through R48, FIGURE 4B, conductor 136, FIGURES 4B and 4A, diodes D17 D10, which results in Q17, FIGURE 4B, being turned off and, through feedback associated with this flip-flop, Q18 turned on. This results respectively in Q19 being turned off and Q20 turned on. The preferred side gate oscillators 76 and 77, FIGURE 4C, are thus turned off, and the non-preferred gate drive oscillators of component 75, FIGURE 4C, are then turned on as represented by waveform 103 in FIGURE 5I. The gate drive is thus removed from the preferred side SCR's Q1 and Q2, and the non-preferred side SCR's Q3 and Q4 are thus gated on.

Capacitors C14 and C15 associated with Q24 and Q26, FIGURE 4C, are for noise suppression. Capacitors C5, C6, C21 and C22 are also for this purpose. Capacitor C24, FIGURE 4A, serves to delay the transfer in case there should be a transient dip on the preferred source voltage such as would occur when the load 60 was suddenly reapplied on the preferred side lines 61 and 62. Capacitor C23, FIGURE 4A, associated with line 190 delays the turning on of the non-preferred gate drive of component 75, FIGURE 4C (and hence delays the reapplication of voltage to the load through controlled rectifiers Q3 and Q4), until Q1 and Q2 have been off for a long enough interval so they will not conduct when voltage appears across them due to the load voltage be restored by the conduction of Q3 and Q4

Referring to FIGURE 4C, conductors 201*a*, 201*b* of component 76 and conductors 202*a* and 202*b* of component 77 are connected to controlled rectifiers Q1 and Q2, FIGURE 4A. Conductors 203*a*, 203*b* and 204*a*, 204*b* of component 75, FIGURE 4C, are connected to the controlled rectifiers Q3 and Q4, FIGURE 4A The gate drive oscillator components 75, 76 and 77, FIGURE 4C, are standard blocking oscillators with slight modifications to allow the use of a commercial transformer for the output. Power is supplied to the switch logic either from the preferred side through transformer T9, FIGURE 4B, and its associated rectifier-filter or from the logic power supply in the inverter, coming through diode D36 via conductor 187. In either case, about .8 volt is developed across D3 by the switch logic current through it, which voltage serves to bias Q7, Q8, Q24 and Q26 via line 125.

Lines 210 and 211, FIGURES 4A and 4B, may be connected to external apparatus to allow manual operation of the switching system. Lines 150, 212 and 213 in FIGURE 4B may be brought out to a connection board for possible connection to external auxiliary equipment. Line 212 is connected with line 214, FIGURES 4B and 4C.

Referring to FIGURE 4B, the gate phase control circuit component 72, all components in this block and R66, C14, R67, Q24, R68, R69, C15, and Q26 are not required for one-half cycle switching with no shorting. The non-preferred lines 63, 64, FIGURE 4A, may be connected to the output of an inverter circuit whose power supply is then connected to conductors 186 and 187 in FIGURE 4B as previously described.

A suitable natural convection sink may be associated with the mount of Q1 and Q3, while Q2 and Q4 may each be mounted on a separate heat sink. By way of example, the power supply component 73, FIGURE 4B, may supply a direct current output voltage of 24 volts.

Solely by way of example and not of limitation, the various components illustrated in FIGURE 4 may be as indicated in the following tables:

| Component | Quantity Per Unit | Description |
|---|---|---|
| Q1, Q2, Q3, Q4 | 4 | S.C.R. (2.5 kva. only), 2N687. |
| Q1, Q2, Q3, Q4 | 4 | S.C.R. (7.5 kva. only), 2N1797. |
| Q5, Q6, Q7, Q8, Q17, Q18, Q24, Q26. | 9 | Transistor, 2N1372. |
| Q9 | 1 | Transistor, 2N2322. |
| Q13, Q14, Q19, Q20 | 4 | Transistor, 2N1605. |
| Q21, Q22, Q23, Q25 | 4 | Transistor, 2N2042. |
| D1, D2, D4, D5 | 4 | Diode, 1N462A. |
| D3, D31, D32, D40, D41, D42, D43, D33, D34, D35. | 10 | Diode (Silicon), 1N645. |
| D6, D7, D8, D9, D10, D11, D24, D25, D27, D28, D29, D35. | 12 | Diode, 1N461A. |
| D17 | 1 | Diode, 1N746. |
| D38 | 1 | Diode, 1N755A. |
| D39, D37 | 1 | Diode, 1N759. |
| C1 | 1 | Capacitor: 1 mfd., 200 v., Paper. |
| C2 | 1 | Capacitor: 1 mfd., 100 v., Paper. |
| C3 | 1 | Capacitor: 2 mfd., 25 v., Long Life Type Paper or Elect. |
| C4 | 2 | Capacitor: 100 mfd., 15 v., Long Life Type Elect. |
| C5 | 1 | Capacitor: .01 mfd., 100 v., Paper or Ceramic. |
| C6 | 1 | Capacitor: .047 mfd., 100 v., Paper or Ceramic. |
| C7 | 1 | Capacitor: 2 mfd., 15 v., Long Life Type Elect. |
| C8, C10, C12, C17 | 4 | Capacitor: .022 mfd., 100 v., Paper or Ceramic. |
| C9, C11, C21, C13, C16, C23. | 6 | Capacitor: .0022 mfd., 100 v., Paper or Ceramic. |
| C22, C14, C15 | 3 | Capacitor: .47 mfd., 3 v., Ceramic. |
| C18 | 2 | Capacitor: 25 mfd., 50 v., Long Life Type Elect. |
| C19 | 1 | Capacitor: 50 mfd., 3 v., Long Life Type Elect. |
| | | Capacitor: 85.5 mfd., 120 v. ±, percent. |
| R1 | 1 | Resistor, Composition: 560Ω, 2 w., 10%. |
| R2 | 1 | Resistor, Composition: 1K, 2 w., 10%. |
| R3, R43, R45 | 3 | Resistor, Composition: 1K, ½ w., 10%. |
| R4, R9 | 2 | Potentiometer: 5K, ½ w. Turn Off voltage Adj. |
| R5, R19 | 2 | Resistor, Composition: 22K, ½ w., 10%. |
| R6, R33, R34 | 3 | Resistor, Composition: 3.3K, ½ w., 10%. |
| R8, R11, R32, R66, R68. | 5 | Resistor, Composition: 4.7K, ½ w., 10%. |
| R13, R18, R21 | 3 | Resistor, Composition: 5.6K, ½ w., 10%. |
| R14 | 1 | Resistor, Composition: 3.9K, ½ w., 10%. |
| R16, R53, R54, R57, R59, R61, R65, R70, R73. | 9 | Resistor, Composition: 15K, ½ w., 10%. |
| R20 | 1 | Resistor, Composition: 100Ω, ½ w., 10%. |
| R24 | 1 | Resistor, Composition: 47Ω, ½ w., 10%. |
| R42, R44 | 2 | Resistor, Composition: 150Ω, ½ w., 10%. |
| R46, R47 | 2 | Resistor, Composition 10K, ½ w., 10%. |
| R48, R50 | 2 | Resistor, Composition: 18K, ½ w., 10%. |
| R49 | 1 | Resistor, Composition: 560Ω, ½ w., 10%. |
| R51, R52, R62, R74 | 4 | Resistor, Composition: 56Ω, 1 w., 10%. |
| R55, R58, R63, R72 | 4 | Resistor, Composition: 2.7K, ½ w., 10%. |
| R56, R60, R64, R71 | 4 | Resistor, Composition: 15Ω, ½ w., 10%. |

| Component | Quantity Per Unit | Description |
|---|---|---|
| R67, R69 | 2 | Resistor; Composition: 1.5K, ½ w., 10%. |
| L1 | 1 | Choke: 20 hy. at 15 ma. (900ΩD.C. RIS.). |
| L2 | 1 | Choke: 0.8 hy., 375 ma. |
| T1 | 1 | Transformer, Driver. |
| T2, T3 | 2 | Transformer, Driver. |
| T5, T6, T7, T8 | 4 | Transformer (Sub-Owner). |
| T9, T10 | 2 | Transformer, Filament: 26.5 v. (0.CA). |

*Summary of operation of the embodiment of FIGURES 4 and 5*

When the supply voltage is initially applied to the preferred supply line 61, 62, FIGURE 4A, the voltage may gradually build up as indicated in FIGURE 5A. The preferred source voltage monitor circuit 70, FIGURE 4A, generates a waveform 101 as indicated in FIGURE 5B at circuit point 5B in FIGURE 4A representing the greater of the rectified value of waveform 100, FIGURE 5A, and the rectified derivative of the waveform 100. Before the waveform 101, FIGURE 5B, reaches the return level 106, non-preferred SCR gate drive supply oscillators component 75, FIGURE 4C, will be active, maintaining silicon controlled rectifiers Q3 and Q4, FIGURE 4A, conducting to supply power to load 60 from non-preferred supply lines 63, 64, FIGURE 4A. This condition of rectifiers Q3 and Q4 is indicated by waveform portion 82 of FIGURE 5I.

When waveform 101, FIGURE 5B, is continually above the transfer level 107, capacitor C4, FIGURE 4A, is slowly charged as represented by waveform portion 130*d*, FIGURE 5E. With capacitor C4 fully charged, when waveform 101, FIGURE 5B, exceeds return level 106, a pulse 142, FIGURE 5D, is generated with actuates Q17, FIGURE 4B, via line 136, FIGURE 4A and 4B, to provide an actuating voltage at circuit point 5F of SCR gate drive control flip-flop component 74, FIGURE 4B, as indicated in FIGURE 5F by waveform portion 141. The actuating voltage at circuit point 5F, FIGURE 4B, energizes gate phase control circuit 72, FIGURE 4B, to begin the alternate actuation of gate drive supply oscillator components 76 and 77, FIGURE 4C, for alternately gating silicon controlled rectifiers Q1 and Q2 in the preferred supply line 61, 62, FIGURE 4A, to a conducting condition as represented in FIGURES 5J and 5K. The on times of Q1 and Q2 are coordinated with the supply voltage waveform 100, FIGURE 5A, so that the non-preferred supply lines 63, 64, FIGURE 4A, will not be affected by any load present on the input side of the preferred lines 61, 62 such as a short circuit between lines 61, 62. Thus if the preferred supply fails by virtue of being shorted out, the non-preferred supply will not be shorted even momentarily.

The reactor L1, FIGURE 4B, is chosen such that the current through transformer T3 of gate phase control circuit component 72, FIGURE 4B is approximately 90° out of phase (lagging) with respect to the waveform of the preferred source voltage, FIGURE 5A. This means that oscillator components 76 and 77, FIGURE 4C, will be operative for a period of about 90° on each side of the zero crossing of the preferred side voltage waveform as indicated in FIGURES 5J and 5K. This is a simplification and improvement over the circuit illustrated in FIGURES 1–3. Besides requiring fewer components than the double phased gating scheme of FIGURES 1–3, it also allows the zero current sensing circuit component 35, FIGURE 1, to be removed since the gate pulses for rectifiers Q1 and Q2 are now present during the part of the cycle where the zero current detection would have had to insert them to initiate conduction.

When a failure occurs in the preferred supply as indicated at 100*a* in FIGURE 5A, the absolute value of voltage at circuit point 5B of the preferred side voltage monitor circuit component 70, FIGURE 4A, drops as indicated at 101*a*, FIGURE 5B, switching off transistor Q5 of monitor circuit 70 and switching on transistor Q8 of preferred source return delay circuit 71 to discharge capacitor C4 through Q9 as indicated at 130*e* in FIGURE 5E and thus to actuate flip-flop drive control circuit components 74, FIGURE 4B, to deactivate rectifiers Q1 and Q2 in the preferred supply and to activate rectifiers Q3 and Q4 in the non-preferred supply 63, 64, FIGURE 4A.

When the preferred voltage is restored, the cycle previously described with respect to the initial part of FIGURE 5A is repeated. Capacitor C24, FIGURE 4A, serves to delay any subsequent transfer to the on-preferred supply in case there should be a transient dip on the preferred source voltage such as would occur when the load was suddenly reapplied to the preferred side. Capacitor C23, FIGURE 4A, delays the turning on of the non-preferred gate drive component 75, FIGURE 4C, and hence delays the reapplication of voltage to the load through Q3 and Q4 until Q1 and Q2 have been off for a long enough interval so that they will not conduct when the voltage appears across them due to the load voltage being restored by the conduction of Q3 and Q4.

As previously explained, the system of FIGURES 4 and 5 will detect a failure in the preferred supply and transfer the load to the non-preferred supply before the loss of power causes a malfunction of any equipment constituting the load. Experimental work has indicated that this transfer should occur in no more than ¼ cycle. The present system is capable of detecting in less than ⅛ cycle a catastrophic failure of the preferred source, and in ¼ cycle a dropping of the preferred source voltage slightly below the transfer level indicated at 107 in FIGURE 5B. This speed is accomplished by avoiding the use of any filtered output for comparison purposes and using instead a combination of the rectified preferred output and the rectified derivative of the preferred source voltage, the two signals being weighted to give the same peak values.

It will be apparent that many modifications and variations may be effected without departing from the scope of the novel concepts of the present invention.

I claim as my invention:

1. A switching system for switching from a first electric supply to a second electric supply in the event of an undesired decrease in the voltage of the first supply comprising:

first switching means for connecting the first supply to a load, second switching means for connecting the second supply to the load, control means for actuating one of said switching means and for simultaneously deactuating the other of said switching means, generating means for developing a phase shifted signal relative to the first supply signal, combining means for comparing the magnitude of the phase shifted signal with the first supply signal and for developing a monitor signal substantially equal to the greater of the phase shifted signal and the first supply signal, and means for detecting decreases in the level of the monitor signal for controlling the state of activation of the control means in response thereto.

2. A switching system in accordance with claim 1 wherein said generating means comprises means for developing a time derivative of the supply voltage and wherein said combining means comprises a means for comparing the time derivative voltage and the supply voltage and for developing a monitor signal in response to the greater of the two voltage signals.

3. A switching system in accordance with claim 1 wherein said generating means comprises a differentiating circuit connected to the first supply for providing a differentiated output in accordance with the time derivative of the first supply voltage and wherein said differentiated output has its peak value substantially equalized with the peak value of the supply voltage under normal operating conditions.

4. A switching system in accordance with claim 1 wherein said first switching means comprises a pair of oppositely connected unidirectional conducting controlled static switches controlling supply of current from the first supply to the load, and wherein said control means activates said static switches in phase opposition to the second supply current from the second supply to effectively interpose a high impedance between the load and the first supply with respect to current from the second supply to prevent substantial loading of the second supply by a failure condition in the first supply during switch over from the first to the second supply.

5. A switching system in accordance with claim 1 wherein said control means provides a predetermined time delay between deactuation of said first switching means and actuation of said second switching means to prevent said second electric supply from maintaining conduction of said first switching means upon actuation of said second switching means.

6. A switching system in accordance with claim 1 wherein said control means is operative to activate the respective switches with a leading phase relation to the voltage of the first supply to supply a leading power factor load and activates said switches alternately for time intervals of approximately one-half cycle duration.

References Cited by the Examiner

UNITED STATES PATENTS

| | | | |
|---|---|---|---|
| 2,245,342 | 6/1941 | Hoye | 307—64 |
| 3,201,592 | 8/1965 | Reinert | 307—64 |
| 3,229,111 | 1/1966 | Schumacher | 307—64 |

ORIS L. RADER, *Primary Examiner.*

T. J. MADDEN, *Assistant Examiner.*